United States Patent [19]
Foladare et al.

[11] Patent Number: 6,044,267
[45] Date of Patent: Mar. 28, 2000

[54] METHOD FOR NETWORK OPERABILITY OF A MULTI-FUNCTION CORDLESS/ CELLULAR TELEPHONE

[75] Inventors: Mark Jeffrey Foladare, Kendall Park; Shelley Betty Goldman, East Brunswick; David Phillip Silverman, Somerville; Roy Philip Weber, Bridgewater, all of N.J.

[73] Assignee: AT&T Corporation, New York, N.Y.

[21] Appl. No.: 08/823,764

[22] Filed: Mar. 24, 1997

[51] Int. Cl.[7] ............................................ H04Q 7/20
[52] U.S. Cl. ............................ 455/426; 455/465; 455/552
[58] Field of Search ................................. 455/426, 432, 455/433, 444, 462, 445, 560, 552, 456, 465, 421

[56] References Cited

U.S. PATENT DOCUMENTS

| | | | |
|---|---|---|---|
| 4,748,655 | 5/1988 | Thrower et al. | 455/461 |
| 4,980,907 | 12/1990 | Raith et al. | 455/465 |
| 5,090,051 | 2/1992 | Muppidi et al. | 455/410 |
| 5,210,785 | 5/1993 | Sato et al. | 455/552 |
| 5,260,988 | 11/1993 | Schellinger et al. | 455/552 |
| 5,309,502 | 5/1994 | Hirai | 455/426 |
| 5,367,558 | 11/1994 | Gillig et al. | 455/426 |
| 5,463,674 | 10/1995 | Gillig et al. | |
| 5,673,308 | 9/1997 | Akhavan | 455/461 |
| 5,675,629 | 10/1997 | Raffel et al. | 455/552 |
| 5,745,851 | 4/1998 | Goto | 455/432 |
| 5,745,852 | 4/1998 | Khan et al. | 455/433 |
| 5,826,191 | 10/1998 | Krishnan | 455/432 |

FOREIGN PATENT DOCUMENTS

| | | |
|---|---|---|
| 2693863 | 1/1994 | France . |
| WO 94 17639 | 8/1994 | WIPO . |
| WO95 01070 | 1/1995 | WIPO . |

OTHER PUBLICATIONS

International Search Report dated Oct. 30, 1998, for International Application No. PCT/US 98/04357 filed Mar. 6, 1998.

*Primary Examiner*—Nguyen Vo
*Assistant Examiner*—Charles N. Appiah
*Attorney, Agent, or Firm*—Morgan & Finnegan, L.L.P.

[57] ABSTRACT

A method for routing a call to a cordless/cellular telephone accessible over the landline network via a home cordless base station according to a LL#, and acessible over a cellular network according to a mobile identification number (MIN). Upon receiving a call to a cordless/cellular user's land-line telephone number (LL#) or to the corresponding MIN, the landline network ascertains whether the cordless/cellular telephone is within communication range of its home cordless base station. The telephone call is then routed to the home cordless base station only if the CCT is within communication range of the cordless base station. If the CCT is not within range of the home cordless base station, the call is forwarded by the land-line telephone network to the cellular network with the MIN in order to complete a cellular call to the CCT. In an alternative embodiment, the landline telephone network, upon receiving a call to the CCT's LL# or MIN, interfaces with the cellular network provider to ascertain whether the cordless/cellular telephone is active in the cellular mode. If the cellular mode is active, the telephone network forwards the call using the MIN to the cellular network for completion of a cellular call to the CCT. Otherwise, if the cellular mode is not active, the telephone network completes the call to the home cordless base station.

21 Claims, 7 Drawing Sheets

METHOD FOR NETWORK OPERABILITY OF A MULTI-FUNCTION CORDLESS/CELLULAR TELEPHONE

TECHNICAL FIELD

This invention relates generally to wireless radio telephones and, more particularly, to wireless radio telephones operative for selective communication with a landline connected cellular homebase station and a cellular network.

BACKGROUND OF THE INVENTION

Modern cellular telephone systems currently utilize high power, frequency, time and/or code division multiplexed narrowband radio frequency communication techniques to in conjunction with large cells to establish and maintain telephone communications. With the growing popularity of mobile stations configured for operating in these systems, increased flexibility and convenience in user utilization of these mobile stations is desired. One approach to providing user flexibility and convenience while encouraging greater utilization of the mobile stations is by combining the functionality of a cellular mobile station with that of a cordless mobile station, thereby allowing a single cordless/cellular station to make and receive telephone calls either via the cellular network when the cordless/cellular station (or cordless/cellular telephone (CCT)) is out of range of a home cordless base station, or via landlines of the public-switched telephone network (PSTN) when the cordless/cellular station is within range of a home cordless base station. Cordless operation typically uses a frequency band different from that during cellular operation, and typically, separate telephone numbers are used for cordless and cellular operation: each home cordless base station has a land-line subscriber telephone number through which all incoming and outgoing calls are routed, and a mobile identification number (MIN) is assigned by the cellular network provider to the cordless/cellular station.

In U.S. Pat. Nos. 5,127,042 and 5,463,674, to Gillig et al., which are herein incorporated by reference, when a cellular cordless telephone is within range of a cordless base station, telephone calls can be made over the cordless radio channel or transferred from the cellular radio channels to the cordless radio channel. Telephone calls may be made over the cellular radio channels or transferred from the cordless radio channel to one of the cellular telephone channels.

Although systems employing cordless/cellular stations have been proposed such that both cordless and cellular operation may be provided coherently and seamlessly, two separate telephone numbers—a mobile identification number (MIN) for cellular operation and a land-line telephone number for cordless operation—are required, thus giving rise to a reachability problem. That is, a caller who dials the land-line telephone number will not reach the user of the cordless/cellular station when it is not within range of the home cordless base station. Such a caller would then be required to dial the MIN, assuming both telephone numbers are known to the caller. Alternatively, the home cordless base station may be adapted to employ call forwarding such that calls received by the home cordless base station when the cordless/cellular station is not within range are forwarded by the home cordless base station over a second line to the cordless/cellular station MIN. Such a call forwarding mechanism employing a second call over a second line, however, is costly and inefficient with respect to time, resource allocation, and concomitantly money.

Accordingly, there is a need for improved operability of cordless/cellular telephones, and particularly for a method and apparatus that allows a call placed to a land-line telephone number associated with a cordless/cellular telephone to be efficiently forwarded, without using a second line, to a MIN associated with the cordless/cellular telephone when it is not within range of the home cordless base station.

SUMMARY OF THE INVENTION

The above, and related, problems are solved according to the invention by providing a method and apparatus wherein the telephone network, upon receiving a call to a cordless/cellular user's land-line telephone number (LL#) or to the corresponding MIN, ascertains whether the cordless/cellular telephone is within range of its home cordless base station. The telephone call is then routed to the home cordless base station only if the CCT is within range of, and capable of communicating with, the cordless base station. If the CCT is not within range of the home cordless base station, the call is forwarded by the land-line telephone network to the cellular network with the MIN in order to complete a cellular call to the CCT.

In a further embodiment, when an outgoing call is placed by the CCT via the home cordless base station, or when an incoming call is received by the CCT via the home cordless base station, a flag is set in the telephone network and in the cellular network and remains set until the call is terminated. Any calls to the CCT's MIN that are received by the landline network are effectively disconnected, without forwarding the call to the cellular network, if the flag is set. Similarly, any calls to the CCT's MIN or LL# and originating from a cellular station are disconnected by the cellular network if the flag is set.

In another embodiment, the telephone network, upon receiving a call to the CCT's LL# or MIN, interfaces with the cellular network provider to ascertain whether the cordless/cellular telephone is active in the cellular mode. The cellular mode and cordless mode are individually and exclusively active, with the cordless mode being active when the cordless/cellular phone is within range of the home cordless base station. If the cellular mode is active, the telephone network forwards the call using the MIN to the cellular network for completion of a cellular call to the CCT. Otherwise, if the cellular mode is not active, the telephone network completes the call over the landline network to the home cordless base station.

BRIEF DESCRIPTION OF THE DRAWINGS

The invention will be described in greater detail below by way of reference to the accompanying drawings, wherein.

DETAILED DESCRIPTION

Figure 1:
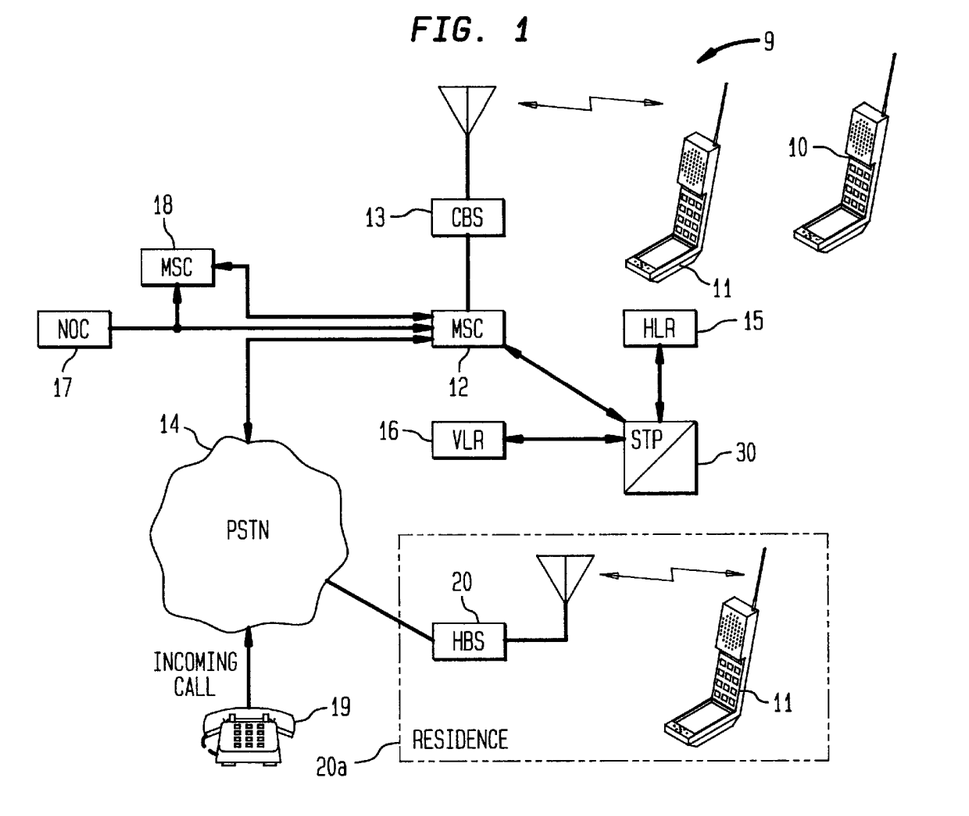
FIG. 1 shows a simplified block diagram of a cellular switching system, its logical entities as well as the relative connection with a public switched telephone network and a home cordless base station.

Referring now to FIG. 1, there is shown a simplified block diagram of a cellular switching system forming part of a wireless cellular phone network illustrated generally at 9, its logical entities as well as the relative connection with the public switched telephone network and a home cordless base station. The cellular concept is well known and is described in general in the *Bell System Technical Journal*, Volume 58, Number 1, January 1979, and specifically in an article entitled *The Cellular Concept* by V. H. MacDonald, on pages 15 through 41 of this journal, the disclosure which is herein incorporated by reference.

Included within the cellular switching system are mobile stations (MS) 10 and 11, mobile switching center (MSC) 12 (also known as a Mobile Telephone Switching Office (MTSO)), the public telephone switched network (PSTN) 14, a cellular base station (CBS) 13, a home location register (HLR) 15, and a visiting location register (VLR) 16. A subscriber station telephone set 19 is illustratively shown connected to the public telephone switched network 14 in a well known manner. The home cordless base station is illustrated as part of a residential premises 20a, shown with the dotted lines. Mobile cordless/cellular station 11 is shown contained in the residential premises where it preferably operates as a cordless unit, and is also separately shown external to the residential premises where it operates as a cellular mobile unit. Also shown is a mobile cellular station 10, which may be a conventional, cellular-only mobile station or another cordless/cellular mobile station associated with another home cordless base station (not shown), although it may be understood that more than one cordless/cellular station may be supported by a single home cordless base station (e.g., a common land-line telephone number and distinct MINs, or distinct land-line telephone numbers as well as distinct MINs).

The wireless telecommunication network 9 typically comprises many units that need to communicate signalling information for controlling connections, which signalling information may include call establishment, reestablishment (hand off), disestablishment (tear down) and maintenance (power control and other processes). Such signalling information is typically communicated over channels separate from the channels carrying actual voice or data communications between the customers being connected. Among the units that need to communicate are the mobile stations 11 (10), the base station 13 connected by radio to the mobile station 11 (19), MSCs 12 and 18, and the various databases that are consulted for the establishment, maintenance and control of mobile calls including the home location register (HLR) 15 and the visitor location register (VLR) 16 which are accessed through conventional signal transfer point (STP) 30.

CBS 13 and mobile station 11 (10) communicate via radio connections and CBS 13 is also connected via trunks to carry the voice or data, and control messages between mobile station 11 (10) and MSC 12. The mobile stations 10 and 11 are designed to operate in a cellular system in accordance with the Telecommunications Industry Association (TIA) Interim Standard (IS)-136, dated December 1994.

For clarity, mobile switching center 12 is illustratively shown connected to mobile switching center 18 and network operation controller (NOC) 17. The mobile switching center 18 is part of the overall cellular systems operation and may similarly have a home location register and a visiting location register, as well as multiple cellular base stations associated therewith. It is understood that other mobile switching centers (MSCs) also may be part of the cellular system. The network operation controller provides overall control and thereby ensures that the operation of the whole cellular system is supported and serviced. The mobile switching center 12 performs all the switching functions related to call delivery and is interconnected to the public telephone switched network 14, the cellular base station 13, and via switch transfer point (STP) 30 to the home location register 15 and the visiting location register 16.

The horse location register 15 maintains a data base, profile record and call routing information or a pointer to the call routing information for all mobile stations in a particular assigned home area. For instance, the HLR indicates the Signalling System 7 (SS7) point code or other address for the network element that contains the VLR currently associated with the mobile station. Also, in accordance with the present invention, the HLR profile record includes information indicating whether the mobile station is a cordless/cellular mobile station and, if so, also includes the corresponding land-line telephone number of the cordless/cellular mobile station.

The visiting location register 16 maintains a data base for call routing information or a pointer to the call routing information for those mobile stations which are visiting its assigned area of coverage. Such information includes the mobile station's present or most recently known area, the station's on/off status, and security parameters.

A wired telecommunications network 14, such as the Public Switched Telephone Network (PSTN), generally comprises a plurality of conventional switches that are interconnected to enable originating station 19 from which a call is placed to communicate with other stations within (e.g., via HBS 20) or outside PSTN 14. The originating station 19 illustrated in FIG. 1 may be a conventional telephone or any other communication device connected to PSTN 14 by various communications links (e.g., via analog, ISDN, etc). As illustrated, PSTN 14 is connected to MSC 12 to allow wireless (mobile) stations 10 and 11 of wireless network 9 to communicate with wired stations of PSTN 14, such as telephone 19.

Figure 2:
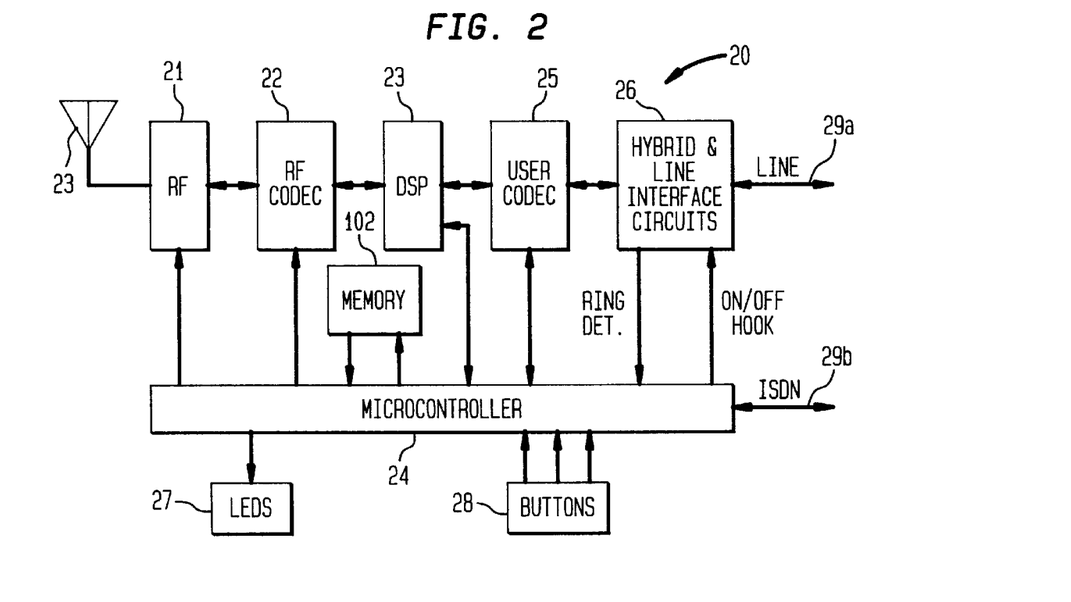
FIG. 2 shows a high level block diagram of a home cordless base station separated into identifiable circuit sections, in accordance with an embodiment of the present invention.

Shown in FIG. 2 is a high-level block diagram of home cordless base station 20 separated into identifiable circuit sections. Design and operation of such home cordless base stations are well known to ordinarily skilled artisans, and the ensuing description sets forth merely by way of example certain functional blocks and their interconnection as may be embodied in a home cordless base station which may be used in accordance with the present invention. Although HCS 20 may communicate with cordless/cellular station 11 according to known analog communication techniques, preferably HCS 20 employs digital communication techniques such as Quadrature Phase Shift Keying (QPSK) modulation of an analog carrier signal operating, for example, at about 900 MHz (or in the range of 46–49 MHz). As described, this operating frequency is preferably distinct from the frequency band (e.g., 824–894 MHz) employed by cellular communication system 9 for communication between CBS 13 and mobile telephones 10 (11).

As shown in FIG. 2, a radio frequency (RF) circuit 21 performs the radio frequency signal processing. Included in this circuit is a radio frequency receiver section which receives the radio frequency signal (e.g., carrier frequency at 900 MHz) from mobile station 11 and, after appropriate filtering and down conversion, produces I and Q signals for an RF CODEC 22 which is connected to the RF circuit 21. A radio frequency transmit section in RF circuit 21 receives I and Q signals from the RF CODEC 22, converts these signals to the appropriate radio frequency range and amplifies them for wireless transmission via antenna 23.

The RF CODEC 22 converts the analog I and Q signals provided by the receiver section of tile RF circuit 21 to a digital datastream, and also generates from a digital datastream the analog I and Q signals provided to the transmitter section of the RF circuit 21. It is understood, therefore, that RF CODEC 22 is operative in performing modulation for the transmission path and demodulation for the reception path.

Connected to the RF CODEC 22 is a digital signal processor (DSP) 23 which performs any baseband signal processing employed by the communication protocol(s) between the home cordless base station and cordless/cellular telephone 11. This may involve, for example, speech encoding/decoding (e.g., compression), automatic gain control, symbol timing recovery, synchronization, and the like. The DSP 23 also communicates with a microcontroller 24 for exchanging control messages. A user CODEC 25 performs conversion of digitally sampled speech signals to analog speech signals and also performs conversion of analog speech signals to digitally sampled speech signals.

Hybrid and line interface circuits interface section 26 performs the required functions for interfacing the private base station 20 to the public switched telephone network 14 via analog line 29a. These include such functions and circuits as, for example, switch-hook operations, hybrid, ring detect, line termination, on/off hook signal interface signals and the like.

The microcontroller 24 performs the communications processing and control functions between the home cordless base station 20 and cordless/cellular station 11, as well as all other control functions that are required for operation of the private base station 20. LEDs 27 may be included to provide visual feedback to a user who preferably may make entries at the home cordless base station using buttons 28 which are connected to the microcontroller 24 in the home cordless base station 20.

Also, microcontroller 24 optionally includes a port and related communications interface circuitry for direct coupling with integrated services digital network (ISDN) communications line 29b, where such ISDN facility is provided from PSTN 14 for communication of voice and data as an alternative to, or in parallel with, communication via analog line 29a. Data may be communicated between microcontroller 24 and PSTN 14 via ISDN communications line 29b regardless of whether CCT 11 is on-hook or off-hook. Protocols that may be used in providing such ISDN communication may be, by way of example, either IS-41 or SS7 which are well-known in the industry.

As shown in FIG. 2, a memory unit 102 is connected to the microcontroller 24 and may contain software used by the home cordless base station microcontroller 24 for effecting control and call processing operations. In addition, memory unit 102 may store user entered landline telephone numbers which may be automatically dialed by a dialer (not shown) which generates a dialing sequence (e.g., as conventional dual-tone multi-frequency (DTMF) signals) under control of microcontroller 24, in response to a memory dial command signal received from cordless/cellular telephone 11.

In accordance with the present invention, microcontroller 24, in conjunction with hybrid and line interface circuits 26 provides for a digital communications protocol incorporated into the voiceband communications link provided over analog line 29a, such that digital messages may be communicated between PSTN 14 and home cordless base station microcontroller 24 over analog line 29a, regardless of whether CCT 11 is on-hook or off-hook. For instance, microcontroller 24 and hybrid and line interface circuits 26 may support ADSI-compatible data communications facilities. As is well known in the art, ADSI standards allow a central office switch of the public switched telephone network 14 to send limited information, such as signaling information, to an analog telephone set regardless of whether the telephone set in on-hook or off-hook. Further information on the ADSI standards can be found in "*Generic Requirements for an SPCS to Customer Premises Equipment Data Interface for Analog Display Services*" BellCore Technical Reference (TR-NWT-001273), Issue 1, December 1992. In addition or alternatively, microcontroller 24 and hybrid and line interface circuits 26 may embody a voice-data (VD) modem.

Figure 3:
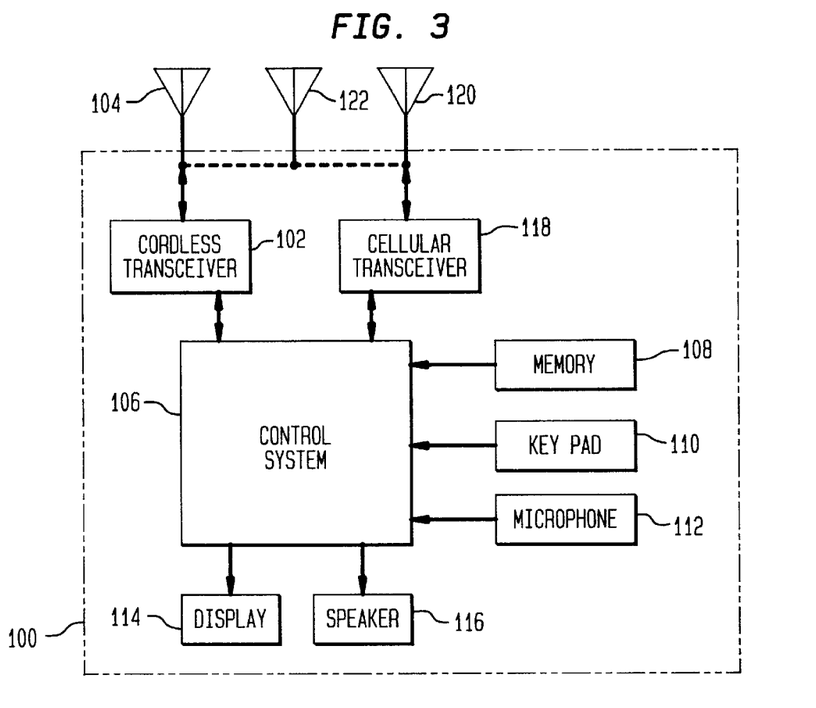
FIG. 3 is a functional block diagram of a cordless/cellular station separated into identifiable circuit sections, in accordance with an embodiment of the present invention.

FIG. 3 illustrates a block diagram of a cordless/cellular communications device 100 such as CCT 11. The design of CCT 11, incorporating both cellular and cordless communications operation, is well known, and may be in accordance with the cellular cordless telephone embodiments disclosed in U.S. Pat. Nos. 5,127,042 and 5,463,674 to Gillig, which are herein incorporated by reference. Cordless/cellular communication device 100 includes cordless transceiver 102 which sends and receives signals from antenna 104. Cordless/cellular communications device 100 also includes cellular transceiver 118 which sends and receives signals from antenna 120. Alternatively, as indicated by dashed lines, cordless tranceiver 102 and cellular transceiver 118 may be coupled to a single antenna 122 in place of antennae 104 and 118. Tranceivers 102 and 118 include any modulation/demodulation, filtering, and other signal processing circuitry required for communicating in accordance with protocol and modulation techniques supported by the cordless and cellular systems, respectively. Cordless transceiver 102 may be any conventional cordless telephone transceiver, and in accordance with HBS 20 preferably employs digital modulation. Similarly, cellular transceiver 102 may be any conventional cellular telephone transceiver.

Cordless/cellular communication device 100 is controlled by control system 106 which preferably includes a microprocessor or a microcontroller unit, as well as any additional analog or digital circuitry for controlling and/or interfacing with each of the elements (e.g., microphone, transceivers, speaker) coupled thereto. Control system 106 uses memory 108 for storing programs that are executed to control cellular and cordless operation, and for storing information that is entered by the user, the distributor, the communication services provider or the manufacturer. Information such as user preferences, user telephone numbers, preferred service provider lists and frequency search schedules are stored in memory 108. Memory 108 may include storage devices such as random access memory (RAM), read only memory (ROM) and/or programmable read only memory (PROM), and such memory devices may also be incorporated into control system 106. A user communicates with control system 106 via keypad 110. Control system 106 communicates information to the user via display 114. Display 114 may be used to display information such as status information and items such as telephone numbers entered via keypad 110. Audio (e.g, voice) information to be transmitted from the mobile communication device 100 is received via microphone 112, and audio communications received by mobile communication device 100 are played to the user via speaker 116.

Figure 4:
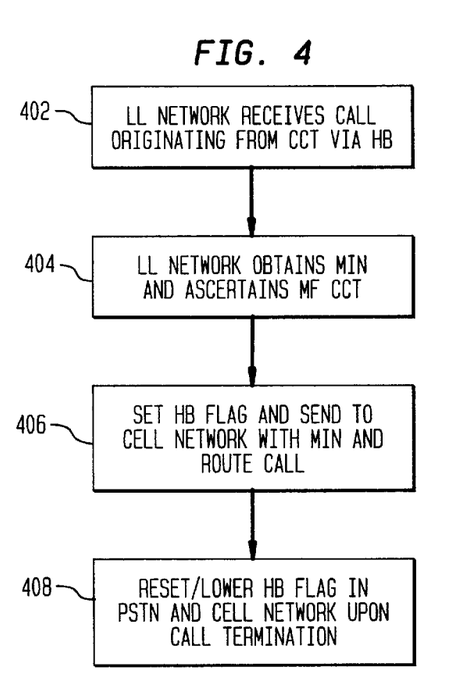
FIG. 4 illustrates a flow diagram for a process executed by a landline network in response to a call placed by a cordless/cellular station via a home cordless base station, in accordance with an embodiment of the present invention.

Referring now to FIG. 4, there is shown a flow diagram for a process executed by the landline network (i.e., PSTN 14) in response to a call placed by CCT 11 via HBS 20. Specifically, when a call is placed by CCT 11 via HBS 20, PSTN 14 detects the off-hook condition (step 402). The landline network also ascertains that the off-hook condition is generated by a multifunction phone (i.e., a CCT), and also obtains the MIN corresponding to CCT 11. There are various ways that this information may be ascertained and obtained. For instance, once CCT 11 goes off-hook, PSTN 14 may query a "trigger table" database within PSTN 14 to determine based on the ANI that the off-hook condition is generated by a multifunction phone. Further, in the event that this trigger table query confirms multifunctionality, then a further query of the same or another (e.g., logically or physically) database may be executed by PSTN 14 to determine the MIN. Alternatively, once CCT 11 goes off-hook it may transmit, either by its own initiation or in response to a query from PSTN 14, a signal indicating that it is a multifunction phone. Similarly, the MIN may be transmitted to PSTN 14 from CCT 11.

In any event, once the landline network has ascertained that the off-hook condition is generated by a multifunction phone with a specified MIN, the call is routed, a "home base" flag (HB Flag) is set in the landline network, and the landline network further sends to cellular network 9 a signaling message including the MIN and causing cellular network 9 to also set a corresponding HB Flag (step 406). HB Flag remains set while the call is in progress, and then is reset in both PSTN 14 and cellular network 9 once the call is terminated (step 408). As will be further understood hereinbelow, in response to an incoming call directed to the MIN, the landline network or the cellular network checks whether the HB Flag is set, and effectively terminates the call if it is set, thereby essentially eliminating apportionment of network call routing and processing resources to calls which necessarily cannot be completed.

Figure 5:
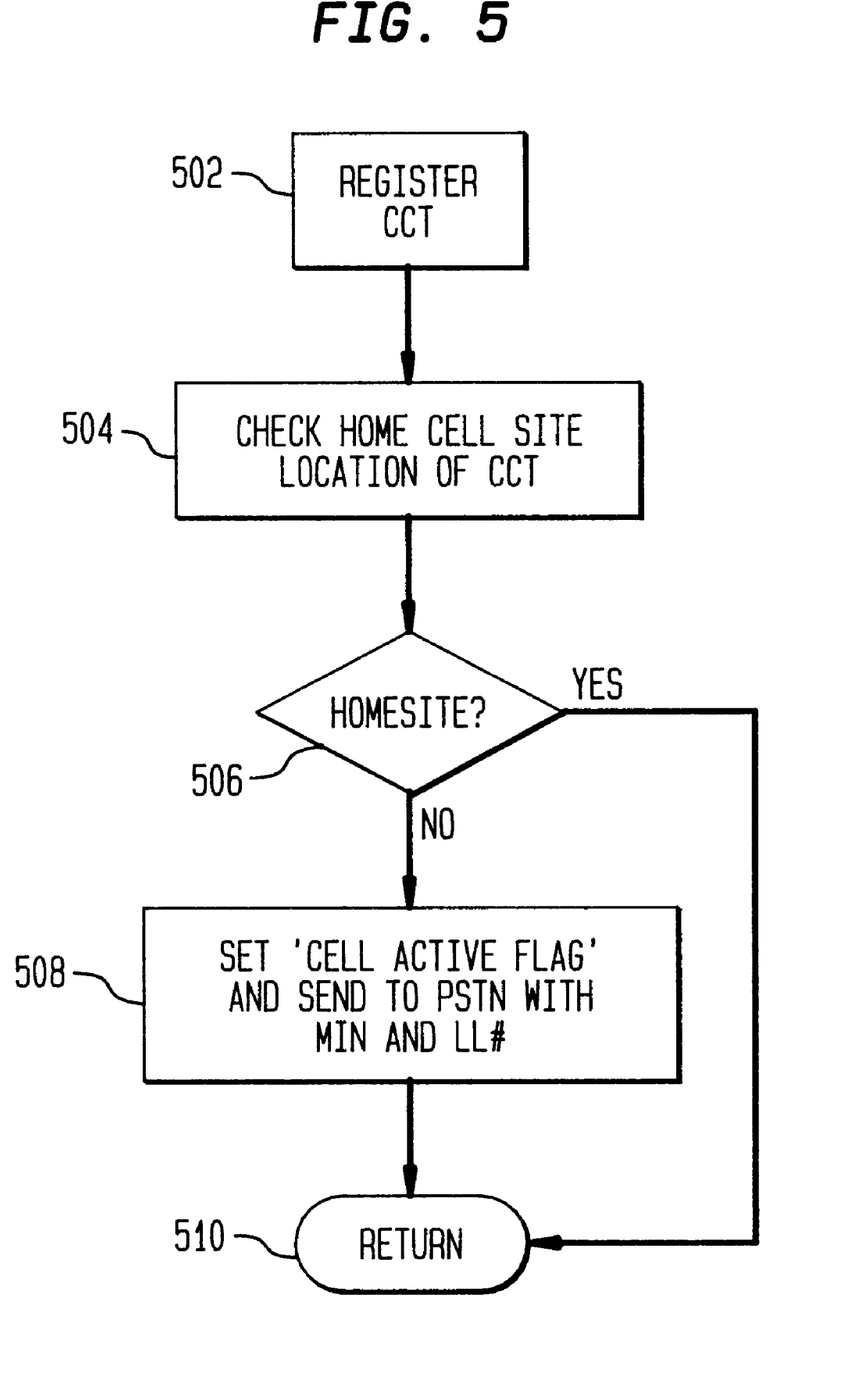
FIG. 5 shows a flow diagram for a registration process executed in the cellular network in response to the cellular mode of a cordless/cellular station being activated, in accordance with an embodiment of the present invention.

In FIG. 5, a flow diagram is shown for a registration process executed in the cellular network 9 in response to the cellular mode of CCT 11 being activated, in accordance with an embodiment of the present invention. Upon activation of the cellular mode, which for example may result from the user pressing a button on CCT 11, cellular network 9 receives the registration request and executes registration procedures accordingly (e.g., allotting a communications channel to CCT 11) (step 502). As part of these registration procedures, cellular network 9 also ascertains (e.g., from CCT 11 or from a database query) that CCT 11 is a multifunction phone (not shown). In addition, cellular network 9 queries HLR 15 via STP 30 to determine the home cell location associated with the home cordless base station (HBS 20) of CCT 11 (step 504). If CCT 11 is not within the home cell location, then a "Cell Active Flag" is set in cellular network 9, and a corresponding flag is set in the landline network in response to a message signal sent to the landline network from cellular network 9, the message, containing the MIN and corresponding LL# (e.g., as ascertained by cellular network 9 from a database query or from CCT 11 during registration) of CCT 11. Once the initial registration procedure is complete, it is periodically updated to confirm the status and location of CCT 11, and The Cell Active Flag is updated accordingly. As will be further understood, the Cell Active Flag is used by the landline network for directly forwarding landline originated calls placed to the LL# or MIN of CCT 11 to cellular network 9, without first ascertaining whether CCT 11 is within range of HBS 20. In accordance with this implementation, it is understood that when CCT 11 is not within its home site, but is active as a cellular station, that it is highly improbable for CCT 11 to return to within range of HBS 20 within the time interval that its cellular status is updated by cellular network 9. It may be appreciated that this feature represents a further embodiment for practicing the present invention, which is not limited to having such a feature, and that the processes depicted in FIGS. 4–7 may be readily modified to remove the "Cell Active Flag" feature without limiting the present invention.

Figure 6:
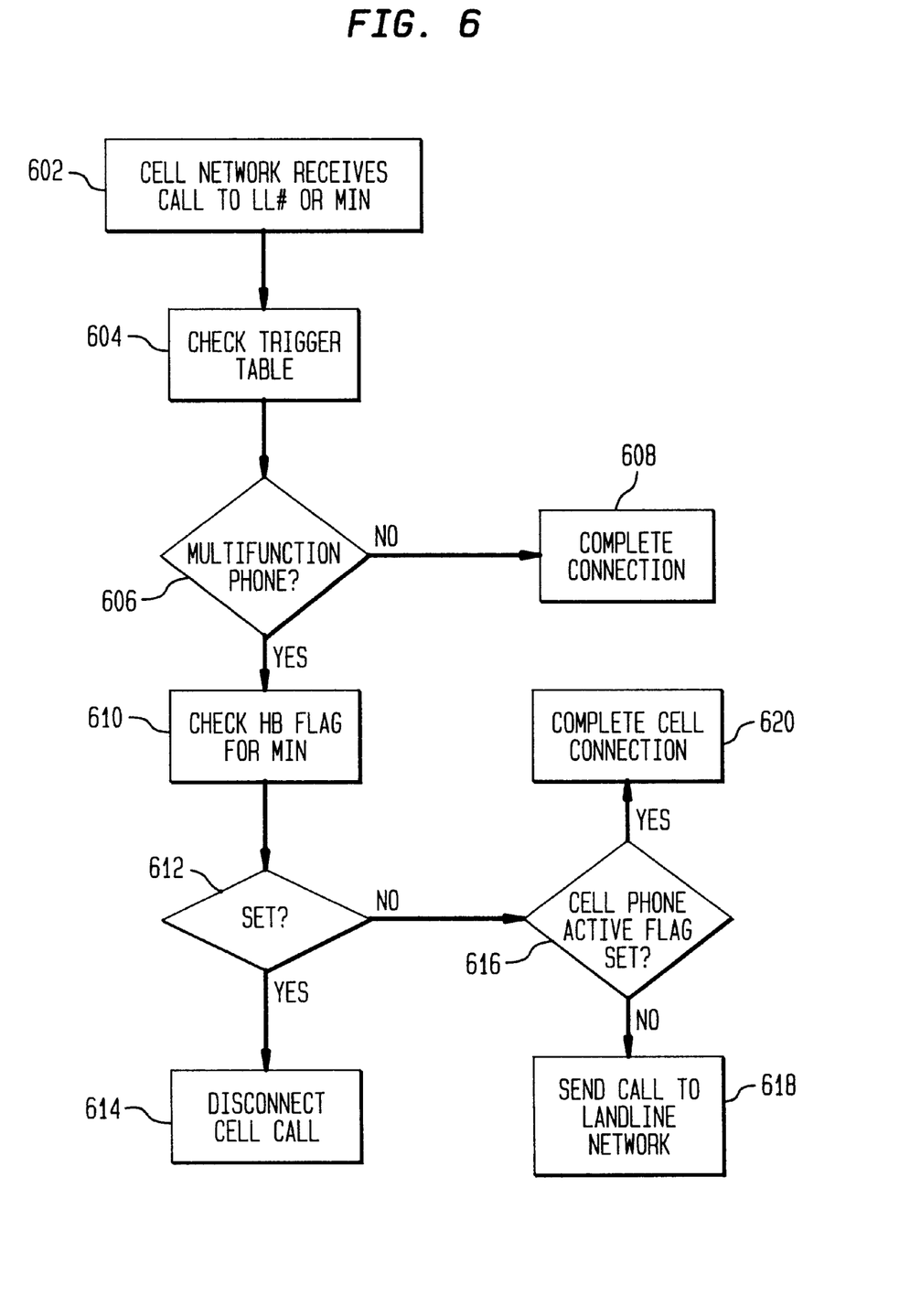
FIG. 6 illustrates an operational flow diagram for a process executed by the cellular communication system in conjunction with the landline network in response to a cellular station dialing a mobile identification number or landline number, in accordance with an embodiment of the present invention.

Referring now to FIG. 6, there is illustrated an operational flow diagram for a process executed by the cellular communication system 9 in conjunction with PSTN 14 in response to a cellular station (e.g., MS 10) dialing a MIN or LL# (e.g., not necessarily of CCT 11). Upon receiving the call, MSC 12 queries a "trigger table" data base to ascertain whether the dialed MIN or LL# is associated with a multifunction phone (steps 602–604). If the dialed number is not associated with a multifunction phone, then the call is completed in a conventional manner, as is well known in the art (steps 606–608). If, however, the dialed number is associated with a multifunction phone (e.g., MIN or LL# of CCT 11), then MSC 12 further queries a database to ascertain whether the HB Flag is set (steps 606 and 610). It is noted that although in the present embodiment equivalent HB Flags are separately stored in landline network (i.e., PSTN 14) and in cellular communication system 9, in an alternative implementation the HB Flag may be stored solely in the landline network, for example, and thus MSC 12 would effect step 610 by sending a query to the landline network (i.e. PSTN 14).

Nevertheless, if the HB Flag is set, indicating that CCT 11 is communicating via HBS 20, then the cellular call from MS 10 is effectively disconnected (e.g., busy tone or audio message stating that party is unavailable). If, however, the HB Flag is not set, indicating that CCT 11 is not communicating via HBS 20, then MSC 12 ascertains whether CCT 11 is active as a cellular station and not within its home cell area (i.e., by checking the Cell Active Flag in step 616). If CCT 11 is activated as a cellular station, then MSC 12 completes the cellular call from MS 10 (step 620), otherwise if CCT 11 is not activated as a cellular station, the call is forwarded by MSC 12 via PSTN 14 to HBS 20 using the LL# corresponding to the MIN (step 618). This LL# is stored in a database accessible to MSC 12 (database access step not shown). If CCT 11 responds via HBS 20 to the call, then the HB Flag is set, and then reset upon call completion (not shown). Preferably, if CCT 11 does not respond via HBS 20, then the call is forwarded back to cellular network 9 in order to attempt cellular call completion (e.g., if CCT 11 is active in the cellular mode and is within the home cell site). As may be appreciated, preferably one or more control bit(s) of the SS7 communications protocol/format may be used to identify the call forwarded by cellular network 9 to PSTN 14 as one which should be forwarded back to the cellular network in the event that the landline call cannot be completed.

It may further be appreciated that in an embodiment which does not employ the Cell Active Flag, steps 616–620 may be replaced by cellular network 9 forwarding the call to PSTN 14 for completion as a landline call; PSTN 14 ascertaining whether CCT 11 is within range of HBS 20; PSTN 14 routing the call to HBS 20 in the event that CCT 11 is within range of HBS 20; and PSTN 14 forwarding the call back to cellular network 9 in the event that the landline call cannot be completed via HBS 20 because CCT 11 is not within range of HBS 20.

Alternatively, in another embodiment which does not employ the Cell Active Flag, steps 16, 18, and 20 may be replaced by: the cellular network querying PSTN 14 as to whether CCT 11 is Lt the home base; PSTN 14 ascertaining from HBS 20 as to whether CCT 11 is within communication range thereof (e.g., as in steps 712–716 of FIG. 7, described hereinbelow); PSTN 14 sending a response signal to cellular network 9; cellular network 9 forwarding the call to PSTN 14 for completion over the landline in the event that CCT 11 is within communication range of HBS 20; and cellular network 9 completing the call as a cellular call in the event that CCT 11 is not within communication range of HBS 20.

Figure 7:
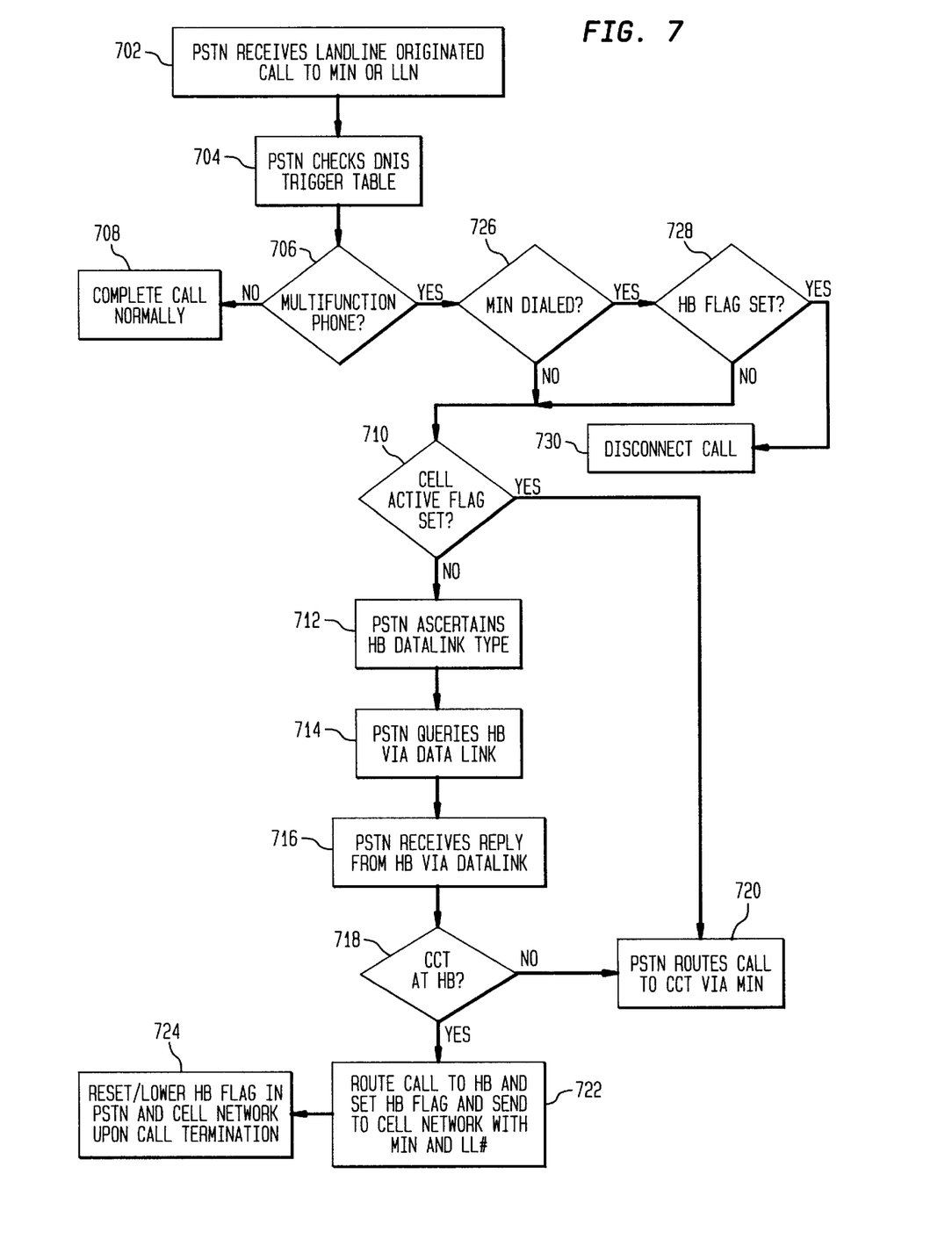
FIG. 7 shows an operational flow diagram for the process executed by the landline network in response to a landline originated call placed to the mobile identification number or landline number of a cordless/cellular station.

Referring now to FIG. 7, an operational flow diagram is illustrated for the process executed by the landline network (i.e., PSTN 14) in response to a landline originated call (e.g., originating from station 19 of FIG. 1) placed to the MIN or LL# of CCT 11. More particularly, once station 19 goes off-hook and dials either the LL# or MIN, PSTN 14 receives these call routing signals (step 702) and checks a Dialed Number Identification Service (DNIS) Trigger Table database (not shown in FIG. 1) located within PSTN 14 in order to ascertain whether the dialed number is associated with a multifunction phone (step 704). If the dialed number is not of a multifunction phone, then PSTN completes the call according to conventional call routing procedures, as are well known in the art (steps 706–708). If, however, the DNIS Trigger Table query indicates that the dialed number is of a multifunction phone, PSTN 14 ascertains whether the dialed number is the MIN or LL# of CCT 11 (step 726). If the MIN was dialed, then PSTN 14 checks whether the HB Flag corresponding to the MIN is set, and if it is set (i.e., indicating that CCT 11 is communicating via HBS 20) disconnects the incoming call by, for example, giving a busy tone or an audible message stating that the party dialed at the MIN is unavailable (steps 726–30).

If, however, the dialed number is the LL# (i.e., not the MIN in step 726), or if the dialed number is the MIN but the HB Flag is not set, then PSTN 14 executes a database query according to the dialed number to check whether the Cell Active Flag is set (step 710). If the Cell Active Flag is set, i.e., indicating that CCT 11 is active in the cellular mode and is in a cell different from the cell of the home cordless base station, then PSTN 14 routes the call to CCT 11 via cellular network 9 according to the MIN of CCT 11 (step 720). It is noted that where the LL# is dialed by station 19, PSTN 14 obtains the corresponding MIN by a query of a landline database (not shown). If, however, in step 710 the Cell Active Flag is not set, then PSTN 14 ascertains (from a query of a landline database) the datalink type/protocol (e.g., ISDN, ADSI, voice-data modem) for communicating with HBS 20 associated with CCT 11 (step 712). Using the appropriate protocol and format, PSTN 14 queries HBS 20 via the datalink as to whether CCT 11 is within range of HBS 20.

In response to this query, HBS 20 attempts to communicate with CCT 11, ascertains whether CCT 11 is within range based on whether or not it receives a reply from CCT 11, and communicates this information to PSTN 14 via the datalink (not shown). Thus, PSTN 14 receives this information from HBS 20 via the datalink (step 716).

If this information indicates that CCT 11 is not within range of HBS 20, then PSTN 14 routes the call to CCT 11 via cellular network 9 according to the MIN of CCT 11 (step 720). It is noted that where the LL# is dialed by station 19, PSTN 14 may obtain the corresponding MIN by, for example, a query of a landline database or from HBS 20 itself (not shown). Alternatively, if in step 718 the information received by PSTN 14 in step 716 indicates that CCT 11 is within range of HBS 20, then PSTN 14 routes the call to HBS 20, sets the HB Flag within the landline network, and sends to cellular network 9 a signaling message (including the MIN) which causes cellular network 9 to also set a corresponding HB Flag (step 722). HB Flag remains set while the call is in progress, and then is reset in both PSTN 14 and cellular network 9 once the call is terminated (step 724).

Figure 8:
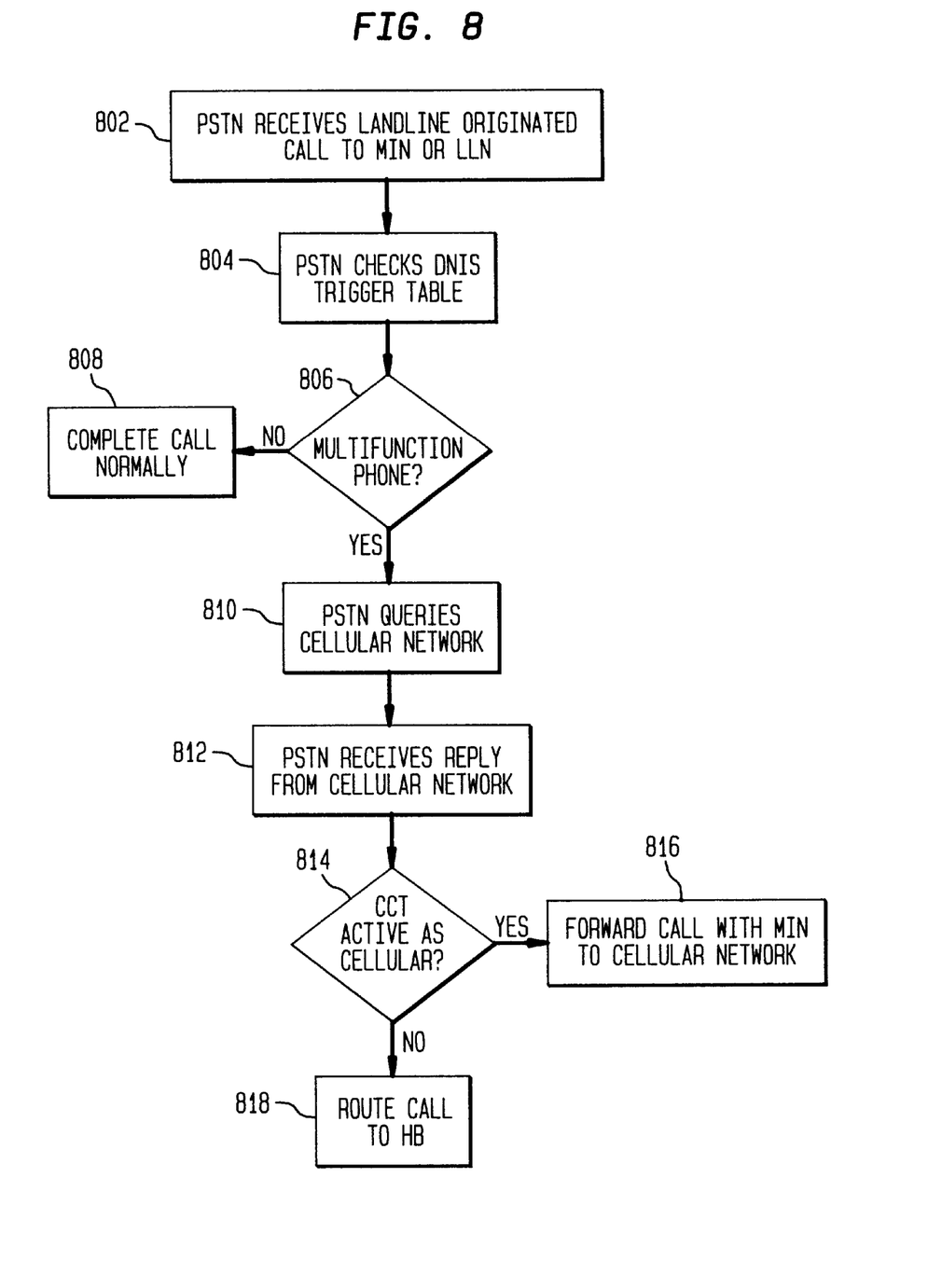
FIG. 8 illustrates the process executed by the landline network in response to receiving a landline originated call directed to a cordless/cellular station according to either the mobile identification number or landline number of the cordless/cellular station, in accordance with another embodiment of the present invention.
Figure 9:
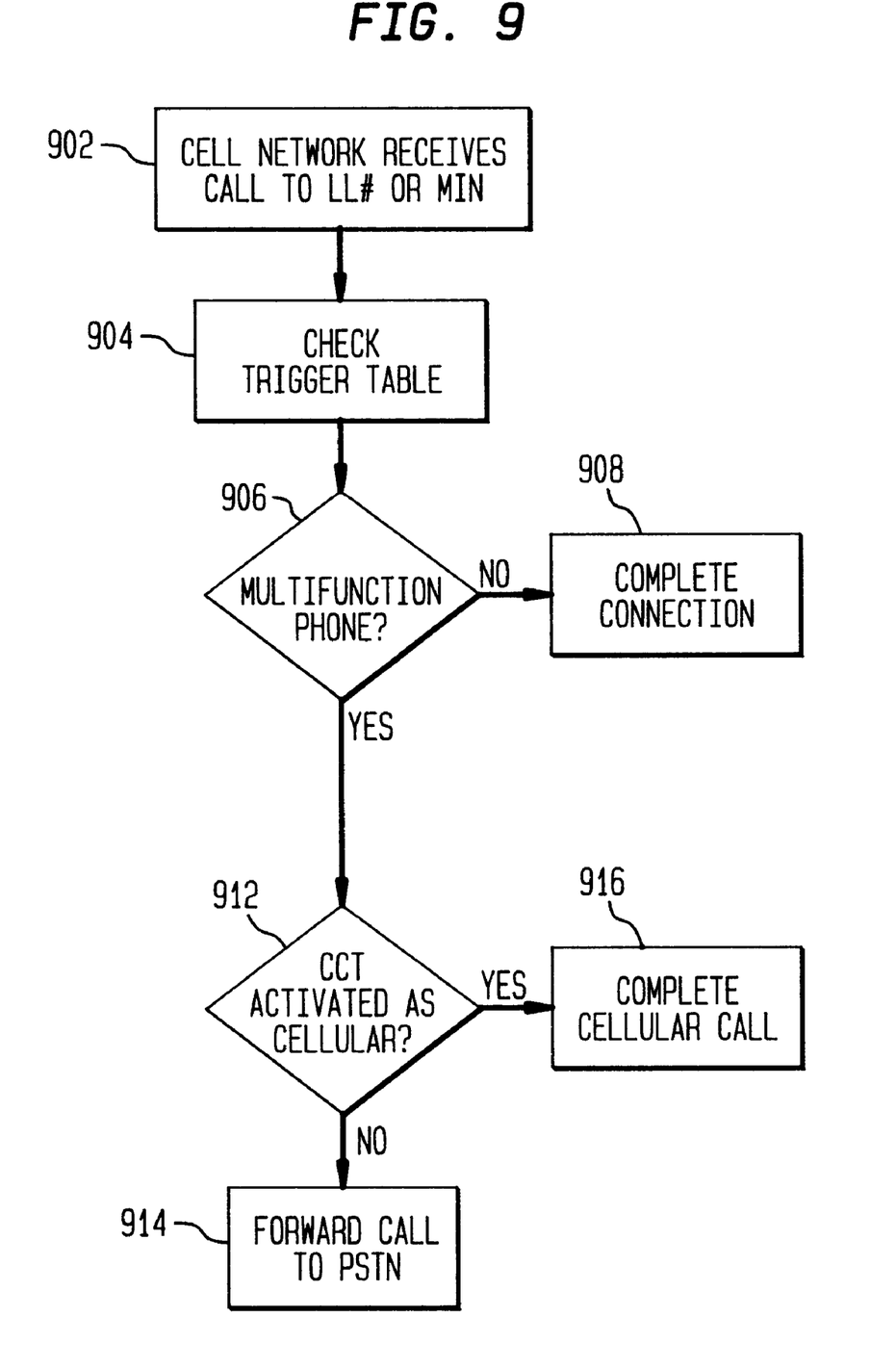
FIG. 9 shows the process executed by cellular network in response to a call originating at a cellular station and directed to a cordless/cellular station according to either the landline number or mobile identification number of the cordless/cellular station, in accordance with an embodiment of the present invention corresponding to the embodiment of FIG. 8.

Referring now to FIG. 8 and FIG. 9, there is shown an alternative embodiment of the present invention. More particularly, FIG. 8 illustrates the process executed by PSTN 14 in response to receiving a landline originated call directed to CCT 11 according to either the MIN or LL# of CCT 11. For example, once station 19 goes off-hook and dials either the LL# or MIN, PSTN 14 receives these call routing signals (step 802) and checks a Dialed Number Identification Service (DNIS) Trigger Table database (not shown in FIG. 1) located within PSTN 14 in order to ascertain whether the dialed number is associated with a multifunction phone (step 804). If the dialed number is not of a multifunction phone, then PSTN completes the call according to conventional call routing procedures, as are well known in the art (steps 806–808). If, however, the DNIS Trigger Table query indicates that the dialed number is of a multifunction phone, in step 810 PSTN 14 sends a query signal to cellular network 9, the query signal being a request as to whether CCT 11 is activated (and available) via the cellular network (e.g., whether CCT is "on" in the cellular mode). In response to this query, cellular network 9 attempts to communicate with CCT 11 (e.g., sending out a page signal), ascertains whether CCT 11 is activated based on whether or not it receives a reply from CCT 11, and communicates this information to PSTN 14 (e.g., using SS7 protocol/format), PSTN 14 thus receiving this information in step 812).

If this information indicates that CCT 11 is activated as a cellular station, then PSTN 14 routes the call to CCT 11 via cellular network 9 according to the MIN of CCT 11 (step 816). It is noted that where the LL# is dialed by station 19, PSTN 14 may obtain the corresponding MIN by, for example, a query of a landline database. Alternatively, if in step 814 the information received by PSTN 14 in step 812 indicates that CCT 11 is not activated as a cellular station, then PSTN 14 routes the call to HBS 20 (step 818).

Referring now to FIG. 9, there is shown the process executed by cellular network 9 in response to a call originating at a cellular station (e.g., cellular station 10 of FIG. 1) and directed to CCT 11 according to either the LL# or MIN of CCT 11, the process of FIG. 9 corresponding to the alternative embodiment of FIG. 8. Upon receiving the call, MSC 12 queries a "trigger table" data base to ascertain whether the dialed MIN or LL# is associated with a multifunction phone (steps 902–904). If the dialed number is not associated with a multifunction phone, then the call is completed in a conventional manner, as is well known in the art (steps 906–908). If, however, the dialed number is associated with a multifunction phone (e.g., MIN or LL# of CCT 11), then cellular network 9 attempts to communicate with CCT 11 (e.g., sending out a page signal) in order to ascertain whether CCT 11 is activated based on whether or not it receives a reply from CCT 11. Accordingly, if cellular network 9 ascertains (step 912) that CCT 11 is activated as a cellular station, then cellular network 9 completes the call as a cellular call according to the MIN of CCT 11 (step 916). It is noted that where the LL# is dialed by station 19, PSTN 14 may obtain the corresponding MIN by, for example, a query of a landline database. Alternatively, if in step 912 cellular network 9 determines that CCT 11 is not activated as a cellular station, then cellular network 9 routes (e.g., forwards) the call to PSTN 14 according to the LL# associated with HBS 20 (step 818) in order to complete the call as a landline call. It is noted that where the MIN is dialed by station 19, cellular network 9 may obtain the corresponding LL# by, for example, a query of a cellular network located database. Alternatively, cellular network 9 may forward the call with the MIN to PSTN 14 (e.g., using an SS7 data slot to indicate that the forwarded call includes the MIN), and PSTN 14 may perform a MIN to LL# number translation.

It may be appreciated, therefore, that the present invention provides many features, advantages, and attendant advantages for not only called party subscribers, but also for calling parties thereof. For instance, a feature of the present invention, as illustrated by the foregoing embodiment, is that there is no attempt to complete a call directed to the MIN of a multifunction phone, either from a landline station or a cellular station, when the multifunction phone is communicating via its cordless home base station. Another feature is that a call originated by a landline device by dialing either the MIN or LL# of a multifunction phone may be connected to the multifunction phone via either the landline or cellular network without requiring two separate lines (e.g., circuits) to effect call forwarding.

Although the above description provides many specificities, these enabling details should not be construed as limiting the scope of the invention, and it will be readily understood by those persons skilled in the art that the present invention is susceptible to many modifications, adaptations, and equivalent implementations without departing from this scope and without diminishing its attendant advantages. It is therefore intended that the present invention is not limited to the disclosed embodiments but should be defined in accordance with the claims which follow.

We claim:

1. A method for a landline network to route calls to a cordless/cellular station, said cordless/cellular station capable of cordless communication with a home cordless base station coupled to said landline network, and capable of wireless communication with a cellular network, said method comprising the landline network executed steps of:

receiving a call to a telephone number associated with said cordless/cellular station;

ascertaining whether said cordless/cellular station is within range of said home cordless base station;

routing said call to said home cordless base station in the event that said cordless/cellular station is within communication range of said cordless base station;

routing said call to said cellular network to complete a cellular connection of said call to said cordless/cellular station in the event that said cordless/cellular station is not within communication range of said home cordless base station;

setting a homebase flag in the event that said cordless/cellular station is communicating via the home cordless base station over the landline network;

checking said flag in response to an incoming call directed to said telephone number; and disconnecting said incoming call, or forwarding said incoming call to a predetermined destination, in the event that said flag is set.

2. The method according to claim 1, wherein said ascertaining step includes the landline network executed steps of:

querying said home cordless base station as to whether said cordless/cellular station is within communication range of said home cordless base station; and receiving a response signal from said home cordless base station, said response signal indicating whether said cordless/cellular station is within communication range of said home cordless base station.

3. The method according to claim 2, further comprising the steps, executed by said home cordless base station after said querying step and before said receiving step, of:

transmitting a homebase query signal for receipt by said cordless/cellular station;

waiting a predetermined time interval for a reply signal from said cordless/cellular station in response to said homebase query signal;

transmitting said response signal to said landline network.

4. The method according to claim 1, wherein said ascertaining step includes the step of determining whether said cordless/cellular station is activated as a cellular station and is not within its home cell site.

5. The method according to claim 1, wherein said telephone number associated with said cordless/cellular station includes a landline telephone number associated with said home cordless base station, and a mobile identification number associated with wireless calls to said cordless/cellular station via said cellular network.

6. The method according to claim 1, further comprising the steps, executed by said cellular network, of:

checking said flag in response to an incoming cellular call directed to said cellular number; and disconnecting, or forwarding to a predetermined destination, said incoming cellular call in the event that said flag is set.

7. The method according to claim 6, further comprising the steps, executed by said cellular network, of:

checking said flag in response to an incoming cellular call directed to said landline number; and disconnecting, or forwarding to a predetermined destination, said incoming cellular call in the event that said flag is set.

8. The method according to claim 1, further comprising the landline network executed step of transmitting a flag update signal, including said flag and associated cellular telephone number, to said cellular network.

9. The method according to claim 1, further comprising the steps, executed by said cellular network, of:

ascertaining whether said cordless/cellular station is within range of said home cordless base station, in response to an incoming cellular call directed to said cellular number; and forwarding said incoming cellular call to said landline network in the event that said cordless/cellular station is within range of said home cordless base station; and completing said incoming cellular call as a cellular connection in the event that said cordless/cellular station is not within range of said home cordless base station.

10. The method according to claim 9, wherein said ascertaining step includes the cellular network executed steps of:

querying said landline network as to whether said cordless/cellular station is within communication range of said home cordless base station; and receiving a response signal from said landline network, said response signal indicating whether said cordless/cellular station is within communication range of said home cordless base station.

11. The method according to claim 10, wherein said landline network, in response to said querying step, executes the steps of:

querying said home cordless base station as to whether said cordless/cellular station is within communication range of said home cordless base station;

receiving a reply signal from said home cordless base station, said reply signal indicating whether said cordless/cellular station is within communication range of said home cordless base station; and sending said response signal to said cellular network.

12. A method for a landline network to route calls to a cordless/cellular station, said cordless/cellular station capable of cordless communication with a home cordless base station coupled to said landline network, and capable of wireless communication with a cellular network, said method comprising the landline network executed steps of:

receiving a call to a telephone number associated with said cordless/cellular station;

ascertaining whether said cordless/cellular station is activated as a cellular station;

routing said call to said home cordless base station in the event that said cordless/cellular station is not activated as a cellular station;

routing said call to said cellular network to complete a cellular connection of said call to said cordless/cellular station in the event that said cordless/cellular station is activated as a cellular station;

setting a homebase flag in the event that said cordless/cellular station is communicating via the home cordless base station over the landline network;

checking said flag, prior to said ascertaining step, in response to an incoming call directed to said telephone number; and disconnecting, or forwarding to a predetermined destination, said incoming call in the event that said flag is set.

13. The method according to claim 12, wherein said ascertaining step includes the landline network executed steps of:

querying said cellular network as to whether said cordless/cellular station is activated as a cellular station; and receiving a response signal from said cellular network, said response signal indicating whether said cordless/cellular station is activated as a cellular station.

14. The method according to claim 12, further comprising the steps, executed by said cellular network after said querying step and before said receiving step, of:

transmitting a page signal for receipt by said cordless/cellular station;

waiting a predetermined time interval for a reply signal from said cordless/cellular station in response to said page signal;

transmitting said response signal to said landline network.

15. The method according to claim 12, wherein said telephone number associated with said cordless/cellular station includes a landline telephone number associated with said home cordless base station, and a mobile identification number associated with wireless calls to said cordless/cellular station via said cellular network.

16. The method according to claim 12, further comprising the steps, executed by said cellular network, of:

checking said flag in response to an incoming cellular call directed to said cordless/cellular station; and disconnecting, or forwarding to a predetermined destination, said incoming cellular call in the event that said flag is set.

17. The method according to claim 16, wherein said telephone number associated with said cordless/cellular station includes a landline telephone number associated with said home cordless base station, and a mobile identification number associated with wireless calls to said cordless/cellular station via said cellular network, and wherein said incoming cellular call is directed to said cordless/cellular station according to said mobile identification number.

18. The method according to claim 16, wherein said telephone number associated with said cordless/cellular station includes a landline telephone number associated with said home cordless base station, and a mobile identification number associated with wireless calls to said cordless/cellular station via said cellular network, and wherein said incoming cellular call is directed to said cordless/cellular station according to said landline telephone number.

19. The method according to claim 12, further comprising the landline network executed step of transmitting a flag update signal, including said flag and associated cellular telephone number, to said cellular network.

20. A method for a landline network to route calls to a cordless/cellular station, said cordless/cellular station capable of cordless communication with a home cordless base station coupled to said landline network, and capable of wireless communication with a cellular network, said method comprising the landline network executed steps of:

receiving a call to a telephone number associated with said cordless/cellular station;

ascertaining, in response to said receiving the call, whether said cordless/cellular station is within range of said home cordless base station by querying said home cordless base station, or by querying information stored in the landline or cellular network;

routing said call to said home cordless base station in the event that said ascertaining indicates that said cordless/cellular station is within communication range of said cordless base station;

routing said call to said cellular network to complete a cellular connection of said call to said cordless/cellular station in the event that said ascertaining indicates that said cordless/cellular station is not within communication range of said home cordless base station;

setting a homebase flag in the event that said cordless/cellular station is communicating via the home cordless base station over landline network;

checking said flag in response to an incoming call directed to said telephone number; and disconnecting said incoming call, or forwarding said incoming call to a predetermined destination, in the event that said flag is set.

21. A method for a landline network to route calls to a cordless/cellular station, said cordless/cellular station capable of cordless communication with a home cordless base station coupled to said landline network, and capable of wireless communication with a cellular network, said method comprising the landline network executed steps of:

receiving a call to a telephone number associated with said cordless/cellular station;

ascertaining, in response to said receiving the call, whether said cordless/cellular station is activated as a cellular station by querying the cellular network or by querying information stored in the landline network;

routing said call to said home cordless base station in the event that said ascertaining indicates that said cordless/cellular station is not activated as a cellular station;

routing said call to said cellular network to complete a cellular connection of said call to said cordless/cellular station in the event that said ascertaining indicates that said cordless/cellular station is activated as a cellular station;

setting a homebase flag in the event that said cordless/cellular station is communicating via the home cordless base station over the landline network;

checking said flag, prior to said ascertaining step, in response to an incoming call directed to said telephone number; and disconnecting, or forwarding to a predetermined destination, said incoming call in the event that said flag is set.

* * * * *